(12) United States Patent
Ohmura

(10) Patent No.: US 7,578,123 B2
(45) Date of Patent: Aug. 25, 2009

(54) EXHAUST CLEANING DEVICE OF DIESEL ENGINE

(75) Inventor: Yasushi Ohmura, Tokyo (JP)

(73) Assignee: Fuji Jukogyo Kabushiki Kaisha (JP)

( * ) Notice: Subject to any disclaimer, the term of this patent is extended or adjusted under 35 U.S.C. 154(b) by 351 days.

(21) Appl. No.: 11/696,841

(22) Filed: Apr. 5, 2007

(65) Prior Publication Data

US 2007/0234712 A1 Oct. 11, 2007

(30) Foreign Application Priority Data

Apr. 7, 2006 (JP) .............................. 2006-106674

(51) Int. Cl.
*F01N 3/00* (2006.01)
(52) U.S. Cl. .............................. 60/297; 60/295; 60/285; 60/286; 60/311
(58) Field of Classification Search .................. 60/285, 60/286, 295, 297, 311
See application file for complete search history.

(56) References Cited

U.S. PATENT DOCUMENTS

| | | | |
|---|---|---|---|
| 6,941,750 B2 * | 9/2005 | Boretto et al. ................. | 60/297 |
| 7,065,960 B2 * | 6/2006 | Gioannini et al. ............. | 60/295 |
| 7,086,220 B2 * | 8/2006 | Imai et al. ...................... | 60/274 |
| 7,100,365 B2 * | 9/2006 | Nishizawa et al. ............ | 60/285 |
| 7,313,913 B2 * | 1/2008 | Okugawa et al. .............. | 60/295 |

FOREIGN PATENT DOCUMENTS

JP 2003-155916 5/2003

\* cited by examiner

*Primary Examiner*—Binh Q. Tran
(74) *Attorney, Agent, or Firm*—Dickstein, Shapiro, LLP.

(57) ABSTRACT

An integrating PM amount σ PM as an integrating value of a PM generating amount after DPF regeneration is read (S1). The integrating PM amount and a first threshold value SL1 set in advance are compared, and the regenerating period of DPF 13 is judged (S2). Further, a differential pressure ΔPdf before and after DPF 13 detected by a differential pressure sensor 16, and a second threshold value SL2 are compared, and the regenerating period of DPF 13 is judged (S5). Regeneration processing of DPF 13 is then performed when the integrating PM amount σ PM attains the first threshold value SL1 or tore, or the differential pressure ΔPdf attains a second threshold value SL2 or more (S7).

13 Claims, 14 Drawing Sheets

FIG. 5
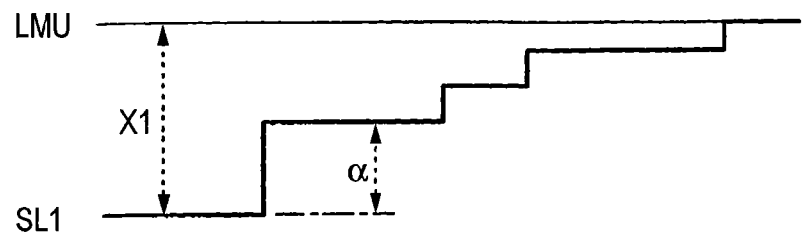
FIG. 6
TABLE T1
| X1 | SMALL ← X1 → LARGE | | | | | | | |
|---|---|---|---|---|---|---|---|---|
| K1 | 0.8 | 0.9 | 1.0 | 1.0 | 1.0 | 1.2 | 1.4 | 1.6 |
FIG. 7
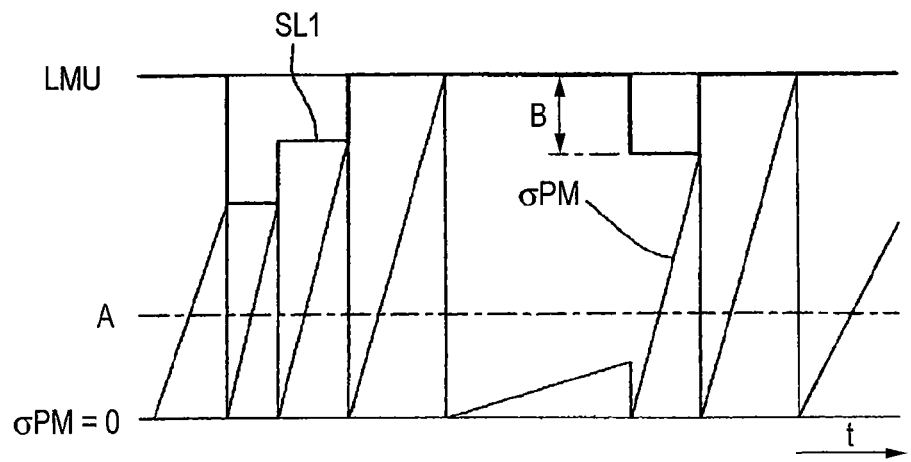

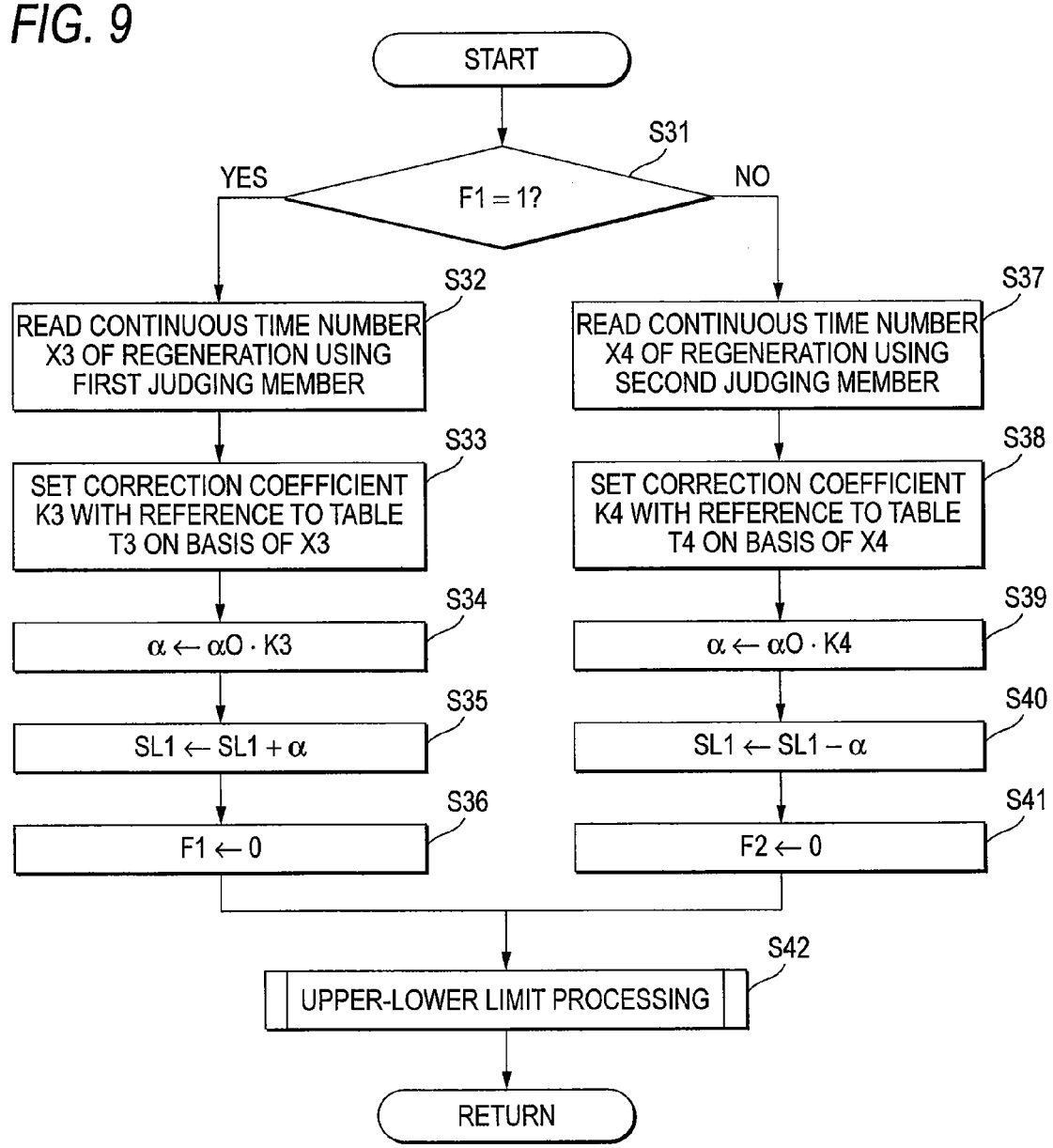

FIG. 13A

TABLE T5

| X5 | SMALL ← X5 → LARGE | | | | | | | |
|---|---|---|---|---|---|---|---|---|
| K5 | 0.5 | 0.6 | 0.7 | 0.8 | 0.9 | 1.0 | 1.0 | 1.0 |

FIG. 13B

TABLE T6

| X5 | SMALL ← X5 → LARGE | | | | | | | |
|---|---|---|---|---|---|---|---|---|
| K6 | 0.5 | 0.6 | 0.7 | 0.8 | 0.9 | 1.0 | 1.0 | 1.0 |

FIG. 15A

TABLE T7

| X7 | SMALL ← X7 → LARGE | | | | | | | |
|---|---|---|---|---|---|---|---|---|
| K7 | 0.5 | 0.6 | 0.7 | 0.8 | 0.9 | 1.0 | 1.0 | 1.0 |

FIG. 15B

TABLE T8

| X7 | SMALL ← X7 → LARGE | | | | | | | |
|---|---|---|---|---|---|---|---|---|
| K8 | 0.5 | 0.6 | 0.7 | 0.8 | 0.9 | 1.0 | 1.0 | 1.0 |

FIG. 17A

TABLE T9

| X9 | SMALL ← X7 → LARGE | | | | | | | |
|---|---|---|---|---|---|---|---|---|
| K9 | 0.5 | 0.6 | 0.7 | 0.8 | 0.9 | 1.0 | 1.0 | 1.0 |

FIG. 17B

TABLE T10

| X9 | SMALL ← X7 → LARGE | | | | | | | |
|---|---|---|---|---|---|---|---|---|
| K10 | 0.5 | 0.6 | 0.7 | 0.8 | 0.9 | 1.0 | 1.0 | 1.0 |

EXHAUST CLEANING DEVICE OF DIESEL ENGINE

BACKGROUND OF THE INVENTION

The present invention relates to an exhaust cleaning device of a diesel engine able to precisely judge a regenerating period of a filter for catching and collecting a particulate matter within exhaust gas.

The disclosure of Japanese Patent Application No. 2006-106674 filed on Apr. 7, 2006 including the specification, drawings and abstract is incorporated herein by reference in its entirety.

In the diesel engine, the particulate matter (PM) included within the exhaust gas is conventionally caught and collected by a filter (DPF: Diesel Particulate Filter) interposed in an exhaust passage. In DPF, the flowed-in exhaust gas passes a porous partition wall and PM is caught and collected by a surface of the partition wall and a fine hole.

PM caught and collected in DPF is deposited with the passage of time. Therefore, after PM reaches a predetermined amount, regeneration processing for removing PM is performed for the purpose of prevention of clogging. Post injection for performing after-injection of fuel and supplying the fuel before DPF is known as a technique for removing PM deposited in DPF. Exhaust gas temperature is raised by the post injection and PM is oxidized and removed.

The DPF regeneration is started when a generating amount of PM is presumed at any time from an engine operating state and an integrating PM amount calculated by integrating this generating amount reaches a set amount. Otherwise, the DPF regeneration is started when a state (exhaust temperature, exhaust pressure, etc.) within the exhaust passage is monitored and it is judged that DPF is clogged.

It is difficult to univocally presume the integrating PM amount on the basis of the operating state of the engine since there is dispersion in the engine. Accordingly, it is difficult to precisely judge the DPF regenerating period. Therefore, when the DPF regeneration is started on the basis of the integrating PM amount, it is required that a threshold value for examining whether the integrating PM amount reaches a predetermined integrating amount or not is set to a safe direction, i.e., is lowly set. However, when the threshold value is lowly set, a DPF regeneration time number is increased and a post injection time number is correspondingly increased. Therefore, a problem exists in that fuel cost becomes worse.

On the other hand, when DPF is judged from the state within the exhaust passage, it is difficult to clearly distinguish a state causing no clogging and a state generating the clogging. In reality, no clogging can be judged when it exceeds no limit of the PM integrating amount desirous to be regenerated. When the regeneration processing after it exceeds the limit of the PM integrating amount is repeatedly performed, a problem exists in that deterioration of DPF is promoted and a reduction of durability is caused.

To cope with this problem, for example, patent literature 1 (JP-A-2003-155916) discloses a technique for measuring a differential pressure before and after DPF and examining whether the clogging is generated or not while the presumed integrating PM amount exceeds no threshold value set in advance.

In the technique disclosed in this literature, when it is judged that DPF is clogged from the differential pressure before and after DPF, manual execution of compulsory regeneration using the operation of a regeneration button of a driver's seat is urged, and DPF is compulsorily regenerated.

[Patent literature 1] JP-A-2003-155916

As mentioned above, there is dispersion in the engine. In the technique disclosed in patent literature 1, the threshold value for examining whether the integrating PM amount reaches an integrating amount set in advance or not is a fixed value. Therefore, this dispersion of the engine cannot be absorbed, and it is difficult to precisely judge the DPF regeneration period.

Further, when the clogging is detected from the differential pressure before and after DPF, the manual execution of the DPF regeneration is merely urged. Therefore, the DPF regeneration period is easily missed. When the DPF regeneration period is repeatedly missed, deterioration of DPF is promoted and a reduction of durability is caused.

SUMMARY OF THE INVENTION

In consideration of the above situation, an object of the present invention is to provide an exhaust cleaning device of the diesel engine able to always precisely judge the regeneration period of the filter for catching and collecting the particulate matter within the exhaust gas by correcting the dispersion of the engine, and able to improve fuel cost by reducing regeneration processing frequency.

To achieve the above object, according to the present invention there is provided an exhaust cleaning device of a diesel engine in which a filter for catching and collecting a particulate matter within exhaust gas is arranged in an exhaust passage, and regeneration processing of the filter is performed in regeneration timing set in advance, the exhaust cleaning device including:

an operating state detecting member for detecting an operating state of the diesel engine;

an integrating member for presuming a generating amount of the particulate matter within the exhaust gas on the basis of the operating state detected by the operating state detecting member, and integrating the generating amount of the particulate matter on the basis of the presumed generating amount of the particulate matter;

a first judging member for comparing the integrating amount integrated by the integrating member and a first threshold value set in advance, and judging a regenerating period of the filter;

a filter state detecting member for detecting a state of the filter;

a second judging member for comparing a detecting value showing the state of the filter detected by the filter state detecting member and a second threshold value, and judging the regenerating period of the filter;

a first correcting member for correcting the first threshold value on a reducing side when it is not judged as the filter regenerating period by the first judging member and it is judged as the filter regenerating period by the second judging member;

a second correcting member for correcting the first threshold value on an increasing side when it is not judged as the filter regenerating period by the second judging member and it is judged as the filter regenerating period by the first judging member; and a regeneration processing member for performing regeneration processing of the filter when it is judged as the filter regenerating period in at least one of the first judging member and the second judging member.

In accordance with the present invention, the regenerating period of the filter is judged on the basis of two judging conditions of the operating state of the diesel engine and the state of the filter. When it is judged as the regenerating period in at least one of these conditions, the regeneration processing of the filter is performed. Further, the first threshold value for judging whether the integrating amount of the particulate matter reaches the regenerating period or not is variably set every regeneration processing. Accordingly, a detection error due to dispersion of the engine is corrected. As its result, the regenerating period of the filter can be always precisely judged. Further, since the regenerating period of the filter is precise, regenerating frequency of the filter is reduced and fuel cost can be correspondingly improved.

BRIEF DESCRIPTION OF THE DRAWINGS

FIG. 5 is a time chart showing a change of a first threshold value in the same first mode.

FIG. 6 is a conceptual view for explaining table T1 in the same first mode.

FIG. 7 is a time chart showing the relation of an integrating PM amount and the first threshold value in the same first mode.

FIG. 9 is a flow chart showing a first threshold value setting subroutine in accordance with a second mode.

FIG. 10(a) is a conceptual view for explaining table T3 and FIG. 10(b) is a conceptual view for explaining table T4 in the same second mode.

FIG. 13(a) is a conceptual view for explaining table T5 and FIG. 13(b) is a conceptual view for explaining table T6 in the same third mode.

FIG. 15(a) is a conceptual view for explaining table T7 and FIG. 15(b) is a conceptual view for explaining table T8 in the same fourth mode.

FIG. 17(a) is a conceptual view for explaining table T9 and FIG. 17(b) is a conceptual view for explaining table T10 in the same fifth mode.

DETAILED DESCRIPTION OF THE PREFERRED EMBODIMENTS

Figure 1:
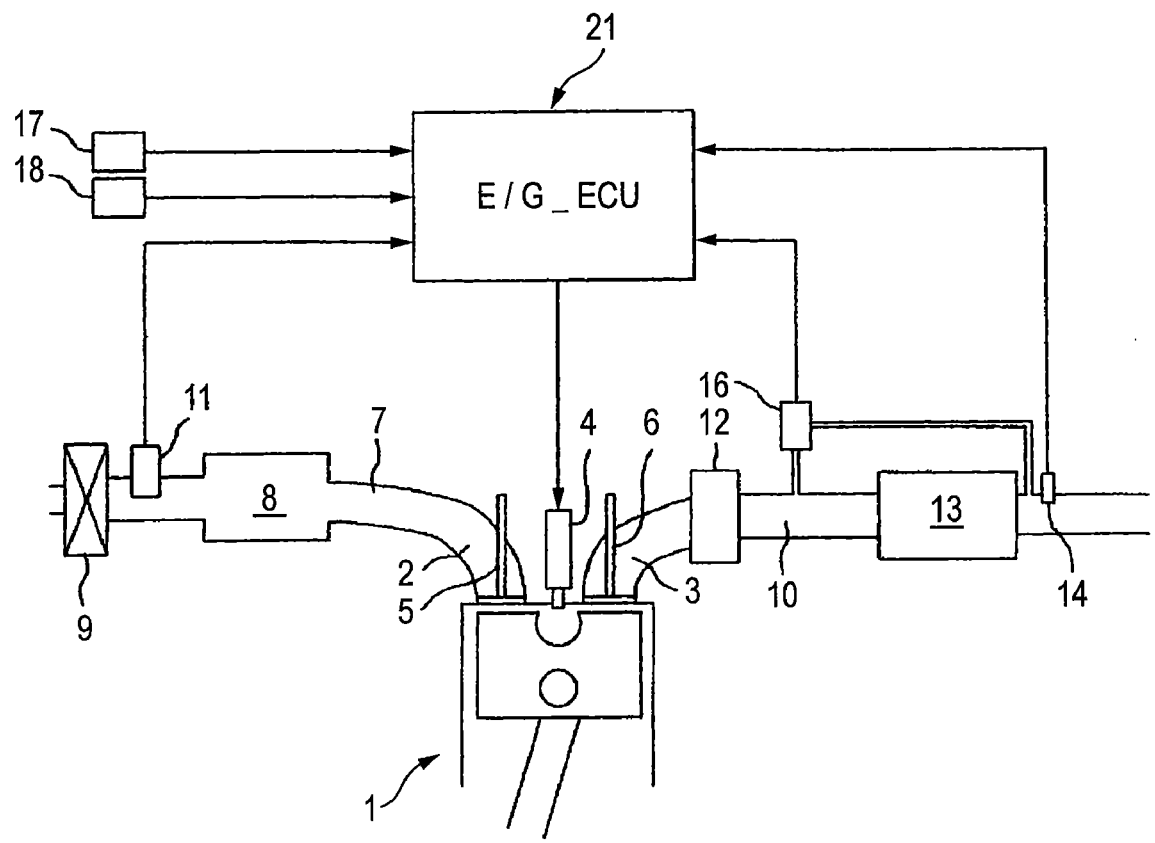
FIG. 1 is a schematic constructional view of a diesel engine in accordance with a first mode.

One mode of the present invention will next be explained on the basis of the drawings. FIGS. 1 to 8 show a first mode of the present invention. FIG. 1 is a schematic constructional view of a diesel engine.

Reference numeral 1 of FIG. 1 designates an engine main body of the diesel engine. An intake air port 2 and an exhaust port 3 are opened to an upper portion of a combustion chamber of this engine main body 1, and an injector 4 faces this upper portion. Reference numeral 5 designates an intake air valve and reference numeral 6 designates an exhaust valve.

Further, an intake air passage 7 is communicated in an upper stream of the intake air port 2, and an intake air chamber 8 is formed in an intermediate portion of the intake air passage 7. Further, an air cleaner 9 is attached to an air taking-in port of this intake air passage 7. An intake air amount sensor 11 for detecting an intake air amount faces a stream just below the air cleaner 9.

Further, an exhaust passage 10 is communicated in a downstream of the exhaust port 3. In this exhaust passage 10, a diesel oxidation catalyst (DOC) 12 and DPF (diesel particulate filter) 13 are interposed from an upstream side. Further, a DPF outlet temperature sensor 14 for detecting outlet temperature (exhaust temperature) of DPF 13 faces a stream just below DPF 13 of the exhaust passage 10. Further, a differential pressure sensor 16 for detecting a differential pressure between the pressure of an inlet and the pressure of an outlet of DPF 13 is arranged in an exhaust system.

For example, DOC 12 is formed by carrying a noble metal such as platinum, palladium, etc., a metallic oxide of alumina, etc. On the surface of a carrier manufactured by ceramic and constructed by a cordierite honeycomb structural body, etc. Hydrocarbon (HC) within exhaust gas is mainly oxidized and is formed as gas by a catalyst reaction, and a particulate matter (PM) within the exhaust gas is intended to be reduced.

On the other hand, DPF 13 is a filter for catching and collecting PM. For example, DPF 13 is formed by molding a heat resisting ceramic of cordierite, etc. in a honeycomb structure, and mesh-sealing many cells as a gas flow path so as to be alternately arranged an inlet side or an outlet side. When the exhaust gas is flowed into this DPF 13, the exhaust gas is flowed to the downstream side while the exhaust gas passes a porous partition wall of this DPF 13. In the meantime, PM within the exhaust gas is caught and collected and is gradually deposited.

Further, in regeneration processing of DPF 13, uncombusted HC is intentionally exhausted by post injection, and is oxidized and reacted by DOC 12. DPF 13 is heated and raised in temperature by heat obtained at that time. DPF 13 is regenerated by burning-up PM caught and collected in DPF 13.

Further, a detecting signal from each of sensors 11, 14, 16 is inputted to an engine control unit (E/G_ECU) 21. A signal showing an engine rotation number detected by an engine rotation number sensor 17, and a signal showing an accelerator aperture detected by an accelerator aperture sensor 18 are inputted to this E/G_ECU 21 in addition to the detecting signal from each of the above sensors 11, 14, 16. Each of these respective sensors 11, 14, 16 to 18 has a function as an operating state detecting member.

E/G_ECU 21 is mainly constructed by a computer such as a micro computer, etc., and has publicly known CPU, ROM, RAM, EEPROM, backup RAM (hereinafter generally called "nonvolatile memory"), etc. On the basis of an operating state detected by various kinds of sensor groups, E/G_ECU 21 sets a fuel injection amount, injection timing, etc. in accordance with a control program stored to ROM. Further, E/G_ECU 21 always presumes a PM generating amount while the diesel engine is operated. E/G_ECU 21 integrates the presumed PM generating amount, and presumes an integrating PM amount σ PM. E/G_ECU 21 then judges a regenerating period of DPF 13 on the basis of the presumed integrating PM amount σ PM.

Here, as a parameter for detecting the operating state of the diesel engine, there are an engine rotation number, engine torque, engine load, an intake air amount, a fuel injection amount, an EGR rate, exhaust temperature, exhaust pressure, an accelerator aperture, a vehicle speed, etc. In this mode, the engine rotation number is detected by the engine rotation number sensor 17, and the intake air amount is detected by the intake air amount sensor 11. The exhaust temperature is detected by the DPF outlet temperature sensor 14, and the accelerator aperture is detected by the accelerator aperture sensor 18.

On the basis of at least one of these respective parameters, a PM generating amount is calculated and mapped from a test, etc. in advance every operating state, and is always presumed by retrieving the map on the basis of this parameter during the operation of the diesel engine.

Further, the clogging (regenerating period) of DPF 13 is presumed from the differential pressure $\Delta Pdf$ of the pressure of the inlet and the pressure of the outlet of DPF 13 detected by the differential pressure sensor 16. Namely, when PM is deposited in DPF 13, flow path resistance is increased and the differential pressure before and after DPF 13 is increased. Accordingly, the clogging (regenerating period) of DPF 13 can be presumed from the differential pressure $\Delta Pdf$ detected by the differential pressure sensor 16.

However, detection accuracy of the differential pressure $\Delta Pdf$ using the differential pressure sensor 16 is coarse and it is difficult to judge the regenerating period. Therefore, it is difficult to precisely distinguish a state generating the clogging in DPF 13 and a state generating no clogging from the differential pressure $\Delta Pdf$. On the other hand, when the regenerating period is judged by only the integrating PM amount $\sigma$ PM, this integrating PM amount $\sigma$ PM is a presumed value so that dispersion of the engine, etc. cannot be absorbed, and a judging error is generated.

Therefore, in this embodiment mode, the regenerating period is detected on the basis of both the integrating PM amount $\sigma$ PM and the differential pressure $\Delta Pdf$. Further, after DPF regeneration processing is performed, a first threshold value SL1 described later is corrected, and the judging error of the DPF regenerating period caused by the dispersion of the engine is corrected and detection accuracy is raised.

Figure 2:
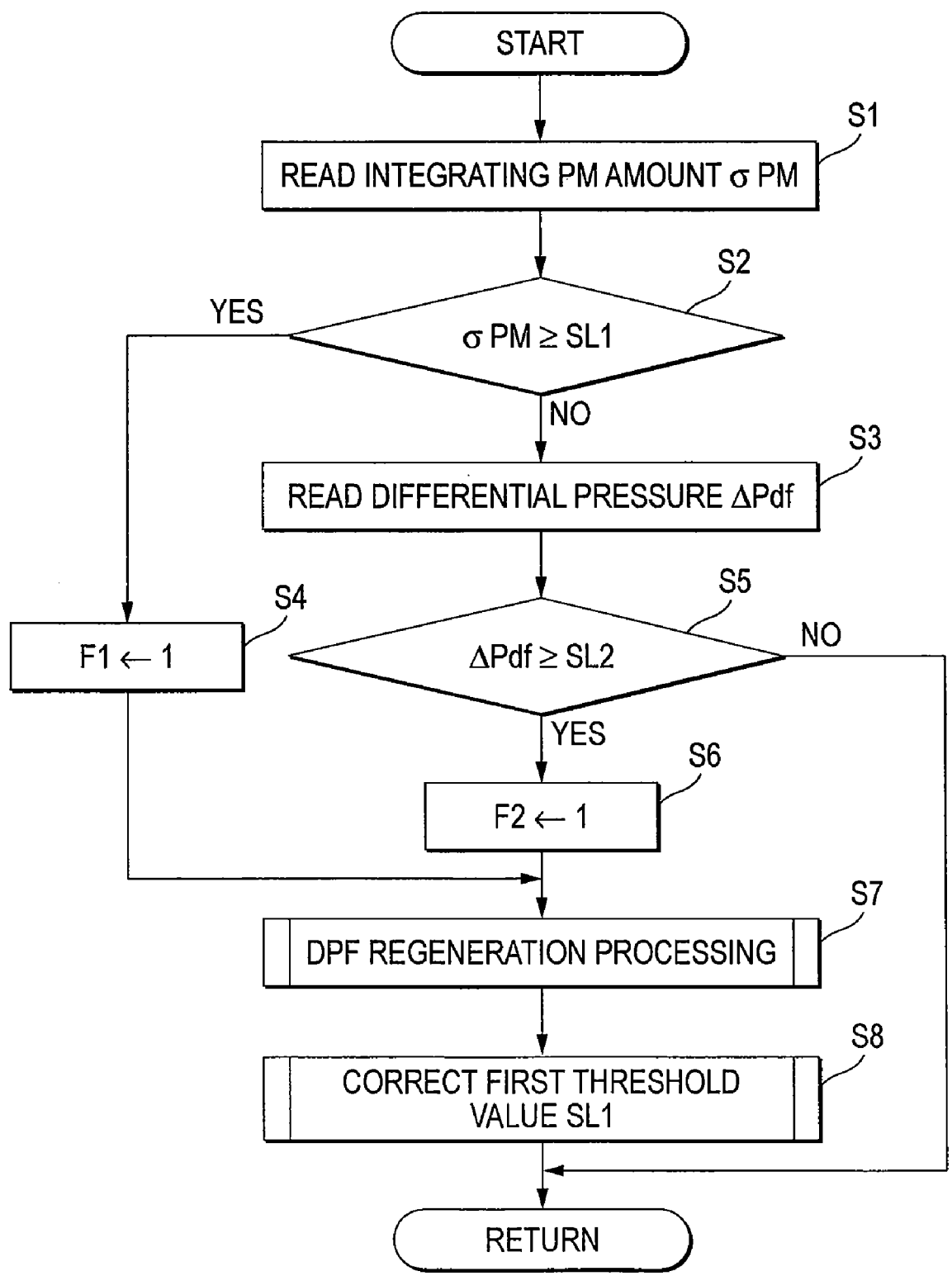
FIG. 2 is a flow chart showing a DPF regeneration processing routine in the same first mode.

The DPF regeneration processing executed by E/G_ECU 21 is concretely performed in accordance with a DPF regeneration processing routine shown in FIG. 2.

This routine is executed every predetermined period after an ignition switch is turned on. First, in step S1, the integrating PM amount $\sigma$ PM stored to a nonvolatile memory is read. This integrating PM amount $\sigma$ PM is calculated in an unillustrated PM amount integrating routine. In this PM amount integrating routine, a PM generating amount is presumed with reference to a map on the basis of a parameter for detecting an operating state during the operation of the diesel engine. This PM generating amount is sequentially added to the integrating PM amount $\sigma$ PM stored to the nonvolatile memory. This integrating PM amount $\sigma$ PM is cleared when the regeneration processing is terminated.

Next, in step S2, the integrating PM amount $\sigma$ PM and the first threshold value SL1 are compared. This first threshold value SL1 is a value for judging the regenerating period of DPF 13. With respect to its initial value, the relation of the integrating PM amount $\sigma$ PM and the clogging of DPF 13 is calculated by an experiment, etc. in advance, and this initial value is set on the basis of this calculation. Further, as described later, the first threshold value SL1 is a variable value corrected every time the DPF regeneration processing is executed.

When no integrating PM amount $\sigma$ PM reaches the first threshold value SL1 ($\sigma$ PM<SL1), it proceeds to step S3. In contrast to this, when the integrating PM amount $\sigma$ PM reaches the first threshold value SL1 ($\sigma$ PM$\geq$SL1), it is judged as the regenerating period of DPF 13 and it is branched to step S4. Then, a first judging flag F1 is set (F1$\leftarrow$1), and it is jumped to step S7.

In the following description, processing for comparing the integrating PM amount $\sigma$ PM and the first threshold value SL1 and judging the regenerating period of DPF 13 is generically named as first judgment processing and will be explained.

Thereafter, when it proceeds to step S3, the differential pressure $\Delta Pdf$ of the pressure of the inlet and the pressure of the outlet of DPF 13 detected by the differential pressure sensor 16 is read. In step S5, the differential pressure $\Delta Pdf$ and a second threshold value SL2 are compared. The second threshold value SL2 is a value for judging the regenerating period of DPF 13 from the magnitude of the differential pressure $\Delta Pdf$. The relation of the differential pressure $\Delta Pdf$ and the clogging of DPF 13 is calculated from an experiment, etc. in advance, and the second threshold value SL2 is a fixed value set on the basis of this relation.

Further, this second threshold value SL2 is basically set to a value at which no regenerating period is judged before it is judged as the regenerating period with respect to the first threshold value SL1. When no differential pressure $\Delta Pdf$ reaches the second threshold value SL2 ($\Delta Pdf$<SL2), it is judged that no DPF 13 yet reaches the regenerating period, and it is escaped from the routine.

On the other hand, when the differential pressure $\Delta Pdf$ reaches the second threshold value SL2 ($\Delta Pdf\geq$SL2), it is judged as the clogging (regenerating period) of DPF 13, and it proceeds to step S6. A second judging flag F2 is then set (F2$\leftarrow$1) and it proceeds to step S7.

In the following description, processing for comparing the differential pressure $\Delta Pdf$ and the second threshold value SL2, and judging the regenerating period of DPF 13 is generically named as second judgment processing and will be explained.

When it proceeds to step S7 from step S4 or step S6, regeneration processing of DPF 13 is executed. A technique for injecting the fuel of a post injection amount set in advance from the injector 4 in an expansion stroke or an exhaust stoke after a compression upper dead point (ATDC) is known as a typical technique as the regeneration processing of DPF 13. Uncombusted HC is exhausted from the exhaust port 3 by post injection from the injector 4 and generates heat by an oxidization reaction within DOC 12, and the exhaust gas raised in temperature is supplied to DPF 13. As its result, this DPF 13 is heated and raised in temperature and PM caught and collected in DPF 13 is burned up and regenerated.

After the regeneration processing of DPF 13 is terminated in a predetermined way, it proceeds to step S8, and the first threshold value SL1 is corrected and it is escaped from the routine. This first threshold value SL1 is corrected in both a first threshold value setting subroutine after the regeneration processing using first judgment processing shown in FIG. 3, and a first threshold value setting subroutine after the regeneration processing using second judgment processing shown in FIG. 4.

First, the first threshold value setting subroutine shown in FIG. 3 will be explained. First, in step S11, the value of the first judging flag F1 is referred and it is escaped from the routine when F1=0. Further, when F1=1, it proceeds to step S12. This first judging flag F1 is set when it is judged as the regenerating period of DPF 13 on the basis of a judging result in the first judgment processing, i.e., a comparing result of the integrating PM amount σ PM and the first threshold value SL1. Accordingly, a correction for raising the first threshold value SL1 is made in step 312 and below.

First, in step S12, a difference X1 (see FIG. 5) between an upper limit value LMU of the first threshold value SL1 and the first threshold value SL1 is calculated (X1←LMU←SL1). Next, it proceeds to step S13, and a first correction coefficient K1 is set with reference to table T1 with an interpolating calculation on the basis of the difference X1. As shown in FIG. 6, the first correction coefficient K1 of a value increased as the difference X1 is increased is stored to table T1. The upper limit value LMU is set to a value slightly lower than a clogging limit of DPF 13.

Next, it proceeds to step S14 and a basic correction value α0 is multiplied by the first correction coefficient K1 and a correction value α is calculated (α←α0+K1). The basic correction value α0 is a fixed value. Further, as described later, when the regeneration processing is repeatedly performed on the basis of a judging result in the first judgment processing, the first threshold value SL1 attains a state stuck to the upper limit value LMU. Therefore, the basic correction value α0 is set to a value close to the upper limit value LMU, or the same value as the upper limit value LMU, i.e., a value slightly lower than the clogging limit of DPF 13. Regeneration processing frequency can be reduced by setting the basic correction value α0 to a value near the upper limit value LMU, or to the upper limit value LMU.

Further, the first correction coefficient K1 is set to a small value as the difference X1 is reduced. Therefore, as shown in FIG. 5, the correction value α is set to a small value as the first threshold value SL1 is close to the upper limit value LMU. As its result, when the first threshold value SL1 becomes a value close to the upper limit value LMU, the correction value α becomes a small value. Therefore, no first threshold value SL1 is suddenly stuck to the upper limit value LMU, and repetition of a change of the first threshold value SL1 can be prevented.

It then proceeds to step S15, and the first is threshold value SL1 stored to the nonvolatile memory is updated by a value provided by adding the correction value α to this first threshold value SL1 (SL1←SL1+α). Accordingly, when the regeneration processing is repeatedly performed on the basis of a judging result in the first judgment processing, the first threshold value SL1 approaches the upper limit value LMU. Thus, in this mode, since the first threshold value SL1 is corrected every DPF regeneration processing, accuracy of the first threshold value SL1 can be raised.

Thereafter, it proceeds to step S16 and upper-lower limit processing is performed. In this upper-lower limit processing, the first threshold value SL1 and the upper limit value LMU and a lower limit value LML are compared. When SL1>LMU or SL1<LML, the first threshold value SL1 is updated by the upper limit value LMU or the lower limit value LML (SL1←LMU or SL1←LML).

After the regeneration processing is performed on the basis of a judging result in the first judgment processing, the first threshold value SL1 is increased. Therefore, when the regeneration processing is repeated, this first threshold value SL1 is excessively raised and the regenerating period of DPF 13 is always close to a limit of the clogging. Therefore, the possibility that excessive raising temperature is attained at a regeneration processing time is caused. Therefore, the upper limit value LMU is arranged with respect to the first threshold value SL1, and the excessive raising temperature at the regeneration processing time is prevented.

Next, it proceeds to step S17 and the first judging flag F1 is cleared (F1←0) and it is escaped from the routine.

Figure 4:
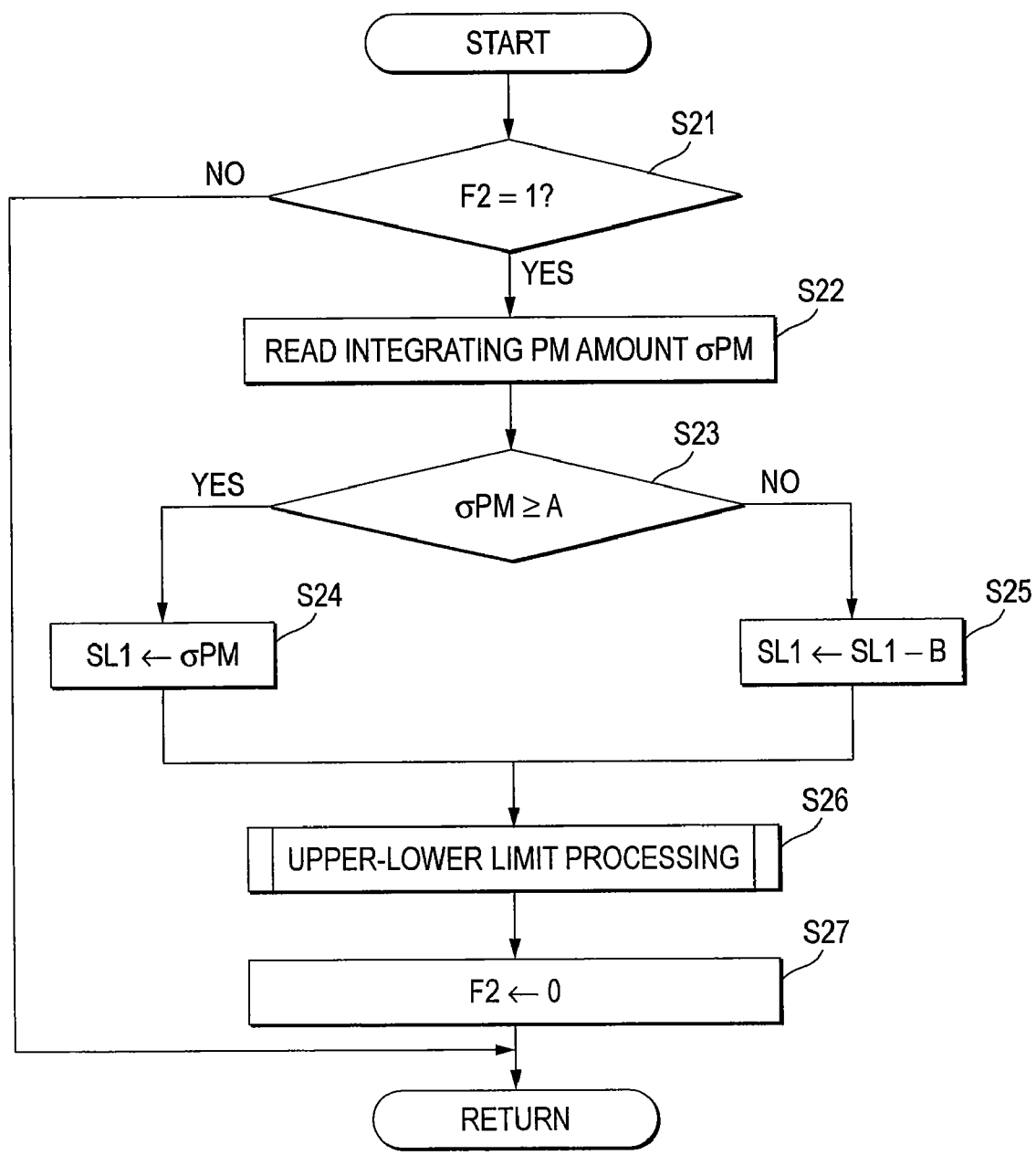
FIG. 4 is a flow chart showing the first threshold value setting subroutine after regeneration processing using second judgment processing in the same first mode.

On the other hand, in the first threshold value setting subroutine shown in FIG. 4, the value of the second judging flag F2 is first referred in step S21, and it is escaped from the routine when F2=0. Further, when F2=1, it proceeds to step S22. This second judging flag F2 is set when it is judged as the regenerating period of DPF 13 on the basis of a judging result in the second judgment processing, i.e., a comparing result of the differential pressure ΔPdf and the second threshold value SL2. Accordingly, a correction for lowering the first threshold value SL1 is made in step S22 and below.

Namely, in step S22, the integrating PM amount σ PM of a DPF regenerating time stored to a nonvolatile memory is read. In subsequent step S23, the integrating PM amount σ PM and a judging value A are compared. This judging value A is a value for examining whether the integrating PM amount σ PM at a judging time of the regenerating period on the basis of the second judgment processing shows a value lower than a normal value. The judging value A is a fixed value calculated from an experiment, etc. in advance.

When σ PM≧A, it proceeds to step S24, and the first threshold value SL1 stored to the nonvolatile memory is updated by the integrating PM amount σ PM (SL1←σ PM), and it proceeds to step S26. In contrast to this, when σ PM<A, it proceeds to step S25, and the first threshold value SL1 stored to the nonvolatile memory is updated by a value provided by subtracting a set value B from this first threshold value SL1 (SL1←SL1-B), and it proceeds to step S26.

As its result, as shown in FIG. 7, when DPF 13 is judged as the regenerating period by the second judgment processing and is regenerated, and the integrating PM amount σ PM at a regenerating time is the judging value A or more, the first threshold value SL1 is set to a peak value of the integrating PM amount σ PM. At the regenerating time of the next time, it is set to a period slightly earlier than the regenerating period using the first judgment processing. On the other hand, when the integrating PM amount σ PM of the regeneration processing time is less than the judging value A, it is set to a value lower by the set value B than the first threshold value SL1 of the previous time, and the regenerating period of the next time is early set.

Thus, in this mode, when the regenerating period is judged on the basis of the differential pressure ΔPdf, and the integrating PM amount σ PM at that time is the judging value A or more, the first threshold value SL1 is updated by this integrating PM amount σ PM. Further, when the integrating PM amount σ PM is less than the judging value A, the first threshold value SL1 is updated by a value subtracted by the set value B. Accordingly, it is possible to correct a judging error caused by dispersion of the engine in judging the regenerating period on the basis of the integrating PM amount σ PM as a presumed value and the first threshold value SL1.

It then proceeds to step S26 and the same processing as the above step S16 is executed and upper-lower limit processing is performed. It then proceeds to step S27 and the second judging flag F2 is cleared (F2←0), and it is escaped from the routine.

Figure 8:
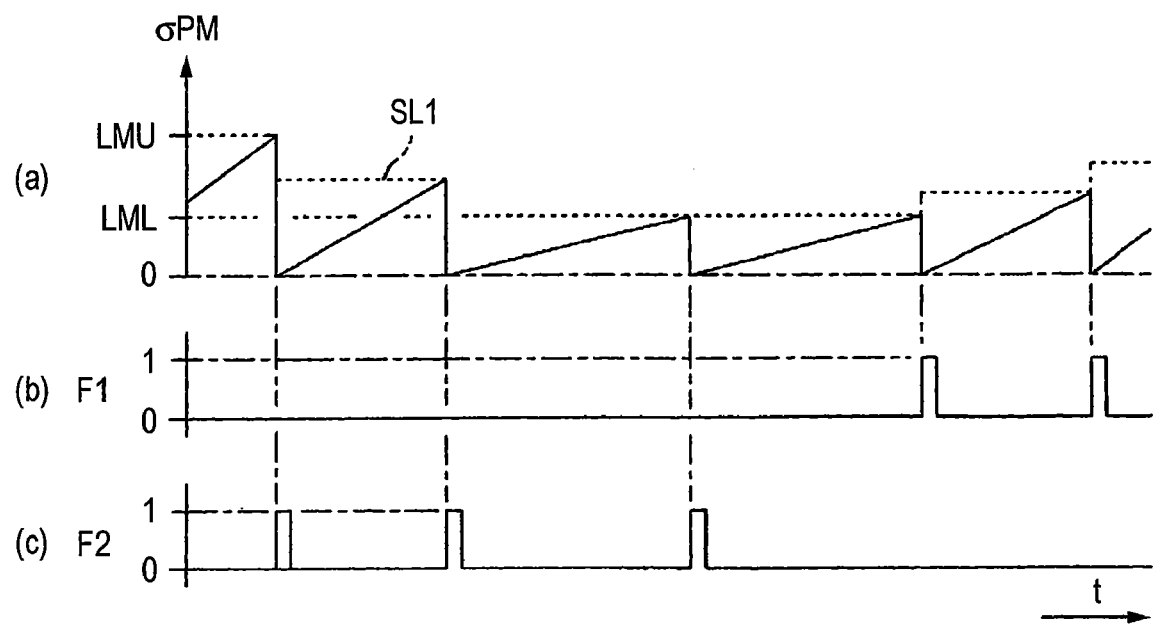
FIG. 8(a) is a time chart showing the relation of the integrating PM amount, the first threshold value, an upper limit value and a lower limit value.
FIG. 8(b) is a time chart showing the relation of a first judging flag and the first threshold value.
FIG. 8(c) is a time chart showing the relation of a second judging flag and the first threshold value in the same first mode.

As its result, as shown in FIG. 8, the first threshold value SL1 is judged as the regenerating period of DPF 13 in the first judgment processing (F1=1), and is increased until the first threshold value SL1 reaches the upper limit value LMU when DPF regeneration is performed. On the other hand, when it is judged as the regenerating period of DPF 13 in the second judgment processing (F1=1) and it is judged that the integrating PM amount σ PM is less than the judging value A and the DPF regeneration is performed, the first threshold value SL1 is reduced until the first threshold value SL1 reaches the lower limit value LML.

Thus, the first threshold value SL1 is increased when it is judged as the regenerating period in the first judgment processing. Further, when it is judged as the regenerating period in the second judgment processing and the integrating PM amount σPM at that time is the judging value A or more, the first threshold value SL1 is set by the integrating PM amount σPM. When it is less than the integrating PM amount σPM, the first threshold value SL1 is reduced. This is repeated every regeneration processing. Thus, a judging error of the DPF regenerating period caused by dispersion of the engine is corrected, and detection accuracy is raised, and the regeneration processing of DPF 13 can be always performed in optimum timing.

In DPF 13, ash (burning cinders of engine oil, etc.) is deposited in addition to PM. This ash is not vanished and is continuously deposited with the passage of time even when the DPF regeneration processing is performed. Therefore, clogging is advanced in DPF 13 with the passage of time even when the DPF regeneration processing is performed. When the clogging of DPF 13 is caused by the deposited ash, differential pressure ΔPdf becomes large. Therefore, the clogging is detected in the second judgment processing before the clogging of DPF 13 is detected in the first judgment processing. As its result, frequency of the regenerating period is increased, but DPF 13 can be continuously used until a PM catching-collecting function is reduced by deterioration. Further, when the DPF regeneration frequency is monitored and the frequency within a set period exceeds a set value, it is judged as deterioration of DPF 13, and its command is notified to an operator. Thus, exchange of DPF 13 can be also urged.

Figure 11:
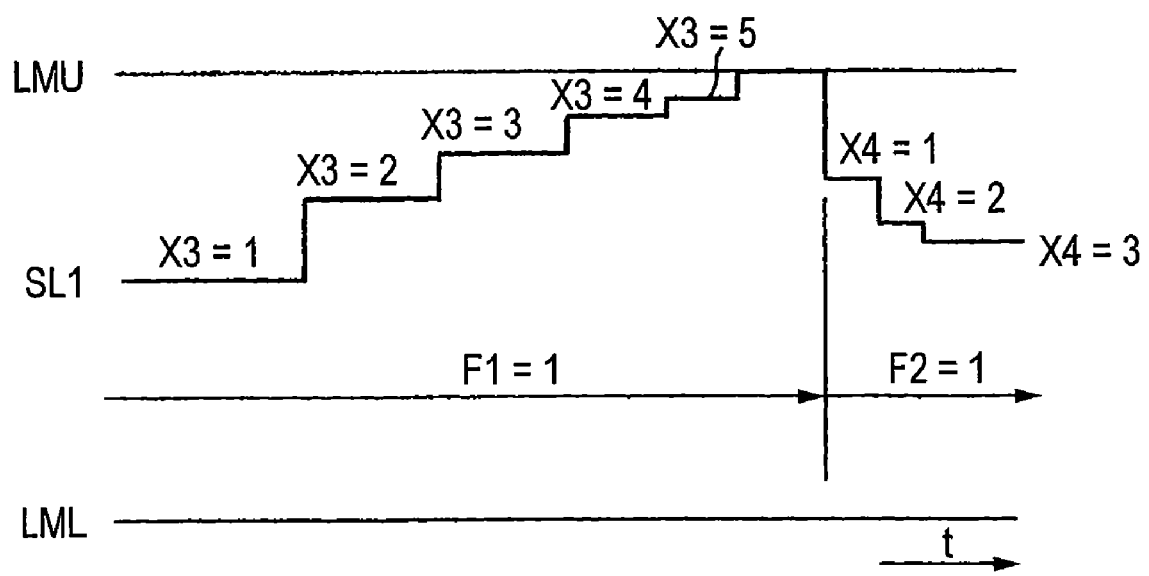
FIG. 11 is a time chart showing a change of the first threshold value in the same second mode.

Further, a second mode in the present invention is shown in FIGS. 9 to 11. A first threshold value setting subroutine shown in FIG. 9 is applied instead of both the first threshold value setting subroutines shown in FIGS. 3 and 4 of the first mode.

In this mode, with respect to the regenerating period of DPF 13, when the regeneration processing is continuously performed on the basis of a judging result of one of the first judgment processing and the second judgment processing, correction value α is gradually reduced in accordance with its continuous time number.

Namely, in this subroutine, the value of first judging flag F1 is first referred in step S31. When F1=1, it is regeneration processing based on a judging result in the first judgment processing. Therefore, it proceeds to step S32. Further, when F1=0 (i.e., F2=1), it is regeneration processing based on the second judgment processing. Therefore, it proceeds to step S37.

In the following description, correction processing of the first threshold value SL1 after the regeneration processing using the first judgment processing shown in steps S32 to S36 will first be explained. Subsequently, correction processing of the first threshold value SL1 after the regeneration processing using the second judgment processing shown in steps S37 to S41 will be explained.

When it is judged as the regeneration processing based on a judging result in the first judgment processing (F1=1) and it proceeds to step S32, a continuous time number X3 of regeneration using the first judgment processing is read and it proceeds to step S33 and a correction coefficient K3 is set with reference to table T3 on the basis of the continuous time number X3. As shown in FIG. 10(a), the correction coefficient K3 at the time of continuous time number X3=1 is set to 1.0 in table T3. The correction coefficient K3 reduced by stages as this continuous time number X3 is increased is stored to table T3.

Next, it proceeds to step S34, and the basic correction value α0 is multiplied by the correction coefficient K3 and the correction value α is calculated (α←α0·K3). The basic correction value α0 is a fixed value. Similar to the first mode, the basic correction value α0 is set to a value close to the upper limit value LMU, or the same value as the upper limit value LMU.

In step S35, the first threshold value SL1 stored to a nonvolatile memory is updated by a value provided by adding the correction value α to this first threshold value SL1 (SL1←SL1+α). It then proceeds to step S36, and the first judging flag F1 is cleared (F1←0), and it proceeds to step S42.

On the other hand, when it is judged as the regeneration processing based on a judging result in the second judgment processing (F1=0) and it proceeds to step S37, a continuous time number X4 of regeneration using the second judgment processing is read and it proceeds to step S38. A correction coefficient K4 is set with reference to table T4 on the basis of the continuous time number X4. As shown in FIG. 10(b), the correction coefficient K4 at the time of continuous time number X4=1 is set to 1.0 in table T4, and the correction coefficient K4 reduced by stages as this continuous time number X4 is increased is stored to table T4. In this mode, the correction coefficients K3, K4 stored to table T3 and table T4 are set to the same value, but may be also set to different values.

Next, it proceeds to step S39, and the basic correction value α0 is multiplied by the correction coefficient K4 and the correction value α is calculated (α←α0·K4)

In step S40, the first threshold value SL1 stored to the nonvolatile memory is updated by a value provided by subtracting the correction value α from this first threshold value SL1 (SL1←SL1-α). It then proceeds to step S41, and the second judging flag F2 is cleared (F2←0) and it proceeds to step S42.

Figure 3:
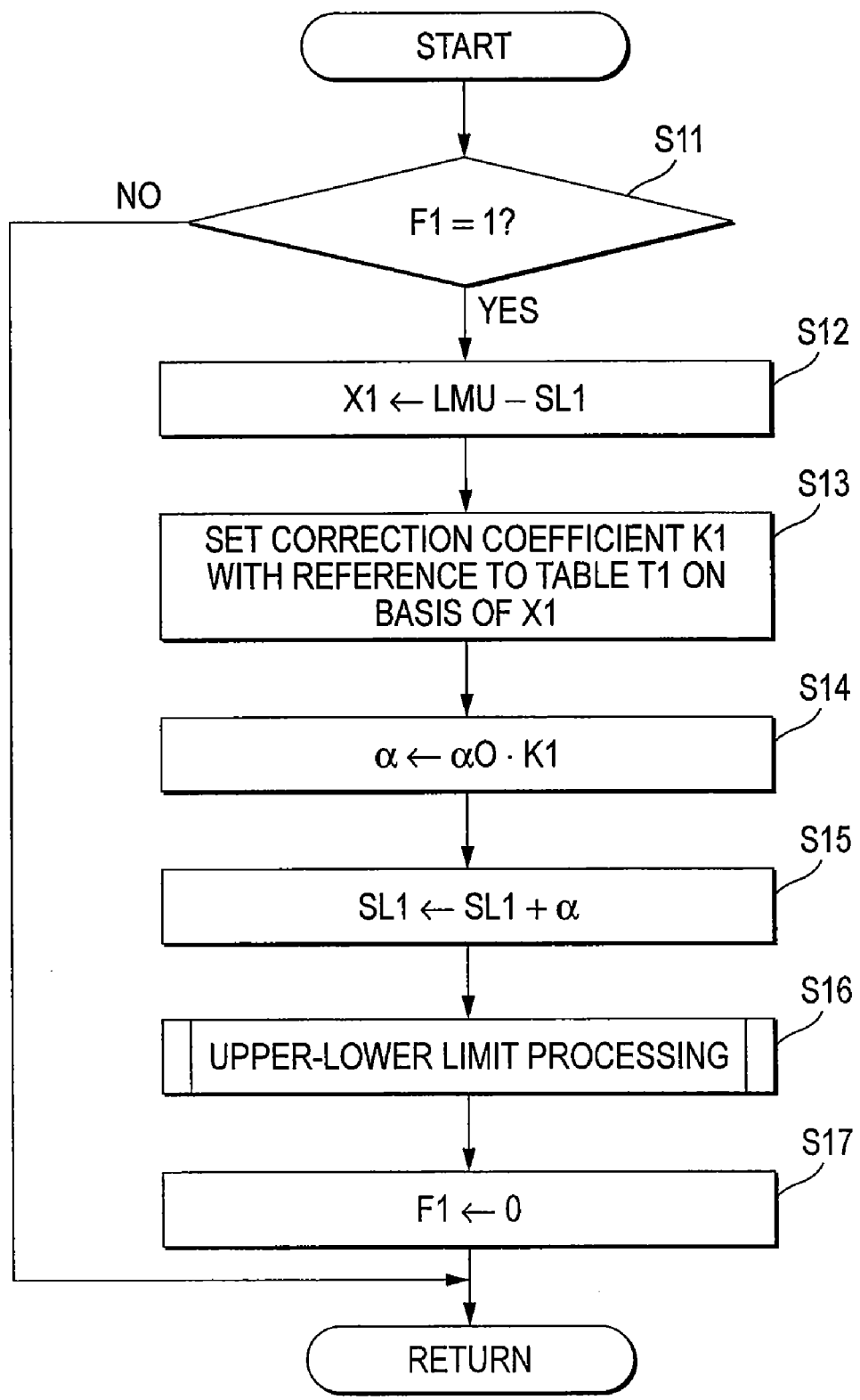
FIG. 3 is a flow chart showing a first threshold value setting subroutine after regeneration processing using first judgment processing in the same first mode.

Thereafter, when it proceeds to step S42 from step S36 or step S41, the same processing as the above step S16 of FIG. 3 is executed and the upper-lower limit processing is performed and it is escaped from the routine.

Thus, in this mode, when the regeneration processing based on a judging result in the first judgment processing or the regeneration processing based on a judging result in the second judgment processing is continuous, the correction coefficient K3 or K4 is set to a value reduced by stages in accordance with the continuous time number X3 or X4. Accordingly, no first threshold value SL1 is suddenly stuck to the upper limit value LMU, and repetition of a change of the first threshold value SL1 can be prevented.

FIG. 11 shows a set example of the first threshold value SL1 in this mode. When the regeneration processing based on the judging result (F1=1) in the first judgment processing is repeatedly performed, the value of the correction coefficient K3 is reduced by stages as its continuous time number X3 is added. Accordingly, an increase width of the first threshold value SL1 is reduced by stages. On the other hand, thereafter, when the regeneration processing based on the judging result (F2=1) in the second judgment processing is performed, the continuous time number X4 becomes X4=1, and the correction coefficient K4 is set to K4=1.0. Therefore, the first threshold value SL1 is greatly reduced, and its reducing width is further reduced by stages in accordance with the continuous time number X4.

Figure 12:
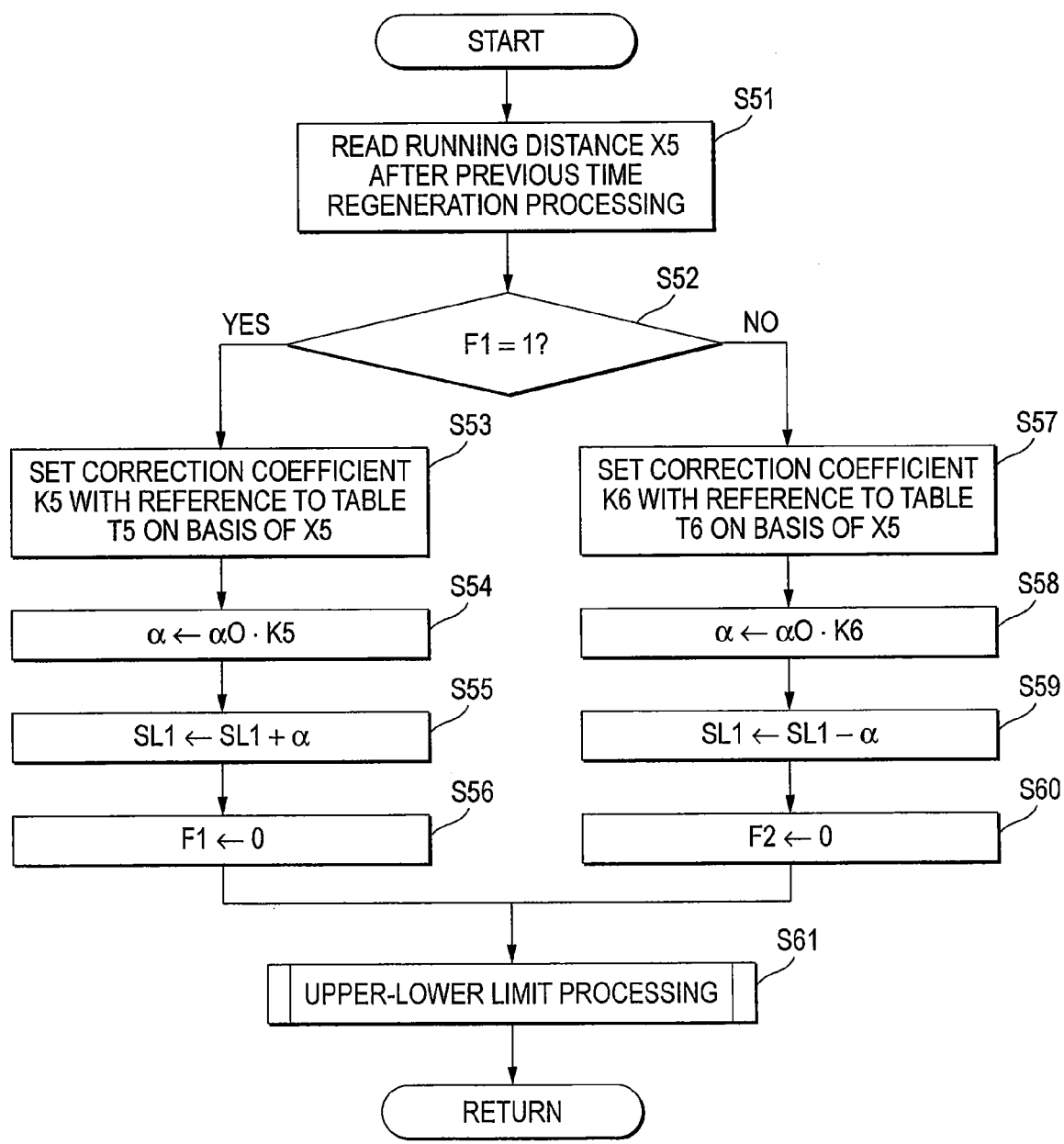
FIG. 12 is a flow chart showing a first threshold value setting subroutine in a third mode.

Further, a third mode of the present invention is shown in FIGS. 12 and 13. This mode is a modified example of the above second mode. In the second mode, when the regeneration processing is continuously performed on the basis of the judging result of one of the first judgment processing and the second judgment processing, the values of the correction coefficients K3, K4 are reduced in accordance with its continuous time number. However, in this mode, the values of correction coefficients K5, K6 are increased in accordance with a running distance X5.

Namely, in a first threshold value setting subroutine shown in FIG. 12, the running distance X5 after the DPF regeneration processing of the previous time is first read in step S51. In step S52, the value of the first judging flag F1 is then referred. When F1=1, it is regeneration processing based on the judging result in the first judgment processing. Therefore, it proceeds to step S53. Further, when F1=0 (i.e., F2=1), it is regeneration processing based on the second judgment processing. Therefore, it proceeds to step S57.

In the following description, correction processing of the first threshold value SL1 after the regeneration processing using the first judgment processing shown in steps S53 to S56 will be explained. Subsequently, correction processing of the first threshold value SL1 after the regeneration processing using the second judgment processing shown in steps S57 to S60 will be explained.

When it is judged as regeneration processing based on the judging result in the first judgment processing (F1=1) and it proceeds to step S53, the correction coefficient K5 is set with reference to table T5 with an interpolating calculation on the basis of the running distance X5. As shown in FIG. 13(a), the correction coefficient K5 (0.5 to 1.0) increased as the running distance X5 is lengthened is stored to table T5.

Next, it proceeds to step S54, and the basic correction value $\alpha 0$ is multiplied by the correction coefficient K5 and the correction value $\alpha$ is calculated ($\alpha \leftarrow \alpha 0 \cdot K5$). The basic correction value $\alpha 0$ is a fixed value. Similar to the first mode, the basic correction value $\alpha 0$ is set to a value close to the upper limit value LMU, or the same value as the upper limit value LMU.

In step S55, the first threshold value SL1 stored to the nonvolatile memory is updated by a value provided by adding the correction value $\alpha$ to this first threshold value SL1 (SL1←SL1+$\alpha$). As mentioned above, the correction coefficient K5 is increased as the running distance X5 is lengthened. Therefore, the first threshold value SL1 is set to a high value as the running distance X5 is lengthened. Thereafter, it proceeds to step S56, and the first judging flag F1 is cleared (F1←0), and it proceeds to step S61.

On the other hand, when it is judged as regeneration processing based on the judging result in the second judgment processing (F1=0) and it proceeds to step S57, the correction coefficient K6 is set with reference to table T6 with an interpolating calculation on the basis of the running distance X5 after the regeneration processing using the second judgment processing. As shown in FIG. 13(b), the correction coefficient K6 (0.5 to 1.0) increased as the running distance X5 is lengthened is stored to table T6. In this mode, the correction coefficients K5, K6 stored to tables T5, T6 are set to the same value, but may be also set to different values.

Next, it proceeds to step S58 and the basic correction value $\alpha 0$ is multiplied by the correction coefficient K6, and the correction value $\alpha$ is calculated ($\alpha \leftarrow \alpha 0 \cdot K6$).

In step S59, the first threshold value SL1 stored to the nonvolatile memory is updated by a value provided by subtracting the correction value $\alpha$ from this first threshold value SL1 (SL1←SL1-$\alpha$). As mentioned above, the correction coefficient K6 is increased as the running distance X5 is lengthened. Therefore, the first threshold value SL1 is set to a high value as the running distance X5 is lengthened. Thereafter, it proceeds to step S60, and the second judging flag F2 is cleared (F2←0) and it proceeds to step S61.

When it proceeds to step S61 from step S56 or step S60, the same processing as the above step S16 of FIG. 3 is executed and the upper-lower limit processing is performed and it is escaped from the routine.

Thus, in this mode, the value of the first threshold value SL1 can be changed in accordance with the running distance X5 from the regeneration processing of the previous time to the regeneration processing of this time. Accordingly, an error after a judgment due to a change of an operating situation at a running time can be corrected, and higher judgment accuracy can be obtained.

Figure 14:
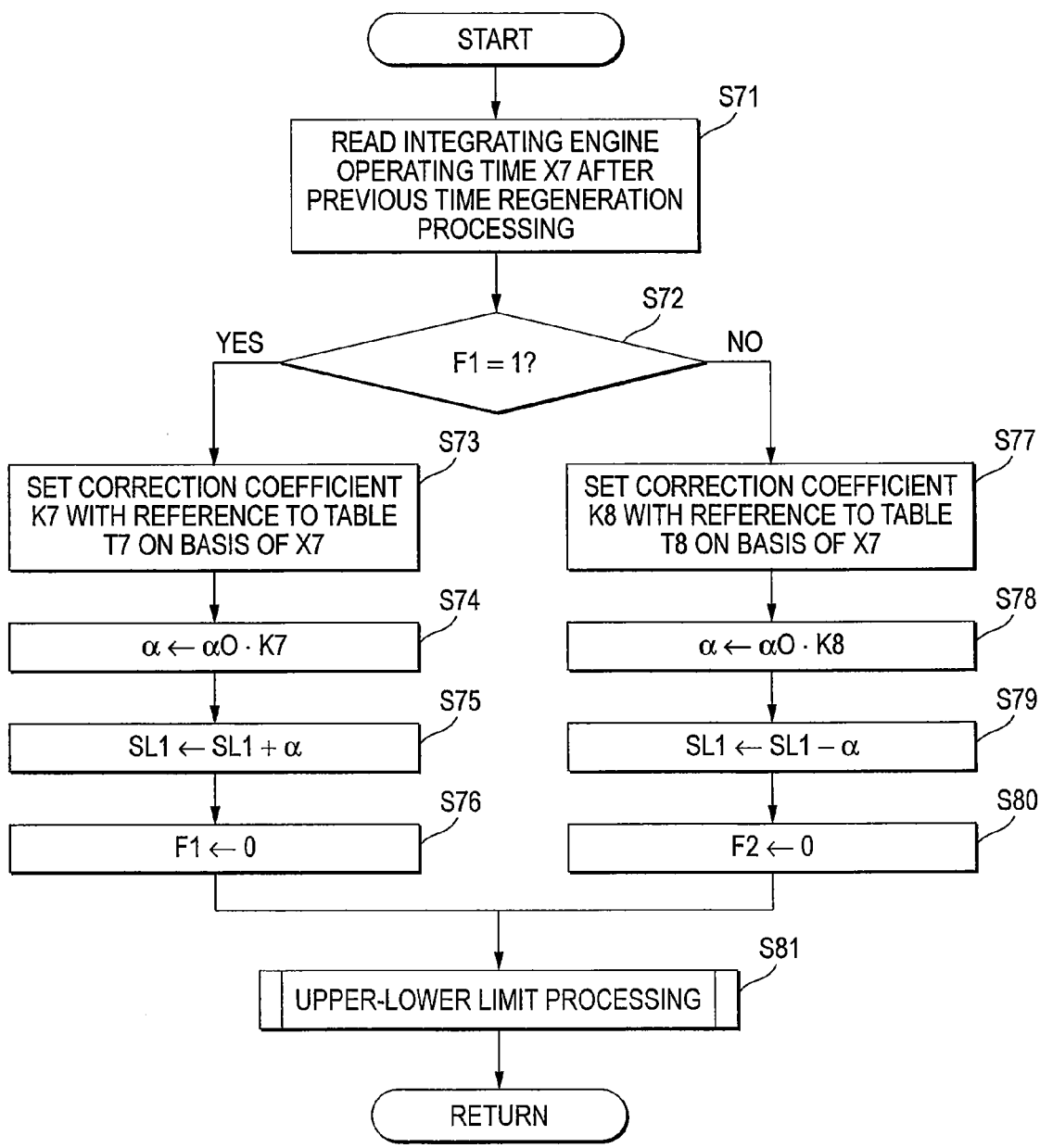
FIG. 14 is a flow chart showing a first threshold value setting subroutine in a fourth mode.

A fourth mode of the present invention is shown in FIGS. 14 and 15. This mode is a modified example of the above third mode. In the third mode, the first threshold value SL1 is changed in accordance with the running distance X5. However, in this mode, the first threshold value SL1 is variably set in accordance with an integrating engine operating time X7.

Namely, in a first threshold value setting subroutine shown in FIG. 14, the integrating engine operating time X7 after the DPF regeneration processing of the previous time is first read in step S71. For example, this integrating engine operating time X7 is calculated by integrating an on-time of an ignition switch after the regeneration processing of the previous time.

Next, the value of the first judging flag F1 is referred in step S72. When F1=1, it is regeneration processing based on the judging result in the first judgment processing. Therefore, it proceeds to step S73. When F1=0 (i.e., F2=1), it is regeneration processing based on the second judgment processing. Therefore, it proceeds to step S77.

In the following description, correction processing of the first threshold value SL1 after regeneration processing using the first judgment processing shown in steps S73 to S76 will first be explained. Subsequently, correction processing of the first threshold value SL1 after regeneration processing using the second judgment processing shown in steps S77 to S80 will be explained.

When it is judged as regeneration processing based on a judging result in the first judgment processing (F1=1) and it proceeds to step S73, a correction coefficient K7 is set with reference to table T7 with an interpolating calculation on the basis of the integrating engine operating time X7. As shown in FIG. 15(a), the correction coefficient K7 (0.5 to 1.0) increased as the integrating engine operating time X7 is lengthened is stored to table T7.

Next, it proceeds to step S74 and the basic correction value $\alpha 0$ is multiplied by the correction coefficient K7, and the correction value $\alpha$ is calculated ($\alpha \leftarrow \alpha 0 \cdot K7$). The basic correction value $\alpha 0$ is a fixed value and is set to a value close to the upper limit value LMU, or the same value as the upper limit value LMU similarly to the first made.

In step S75, the first threshold value SL1 stored to the nonvolatile memory is updated by a value provided by adding the correction value $\alpha$ to this first threshold value SL1 (SL1←SL1+$\alpha$). As mentioned above, the correction coefficient K7 is increased as the integrating engine operating time X7 is increased. Therefore, the first threshold value SL1 is set to a high value as the integrating engine operating time X7 is increased. Thereafter, it proceeds to step S76, and the first judging flag F1 is cleared (F1←0) and it proceeds to step S81.

On the other hand, when it is judged as regeneration processing based on a judging result in the second judgment processing (F1=0) and it proceeds to step S77, a correction coefficient K8 is set with reference to table T8 with an interpolating calculation on the basis of the integrating engine operating time X7 after the regeneration processing using the second judgment processing. As shown in FIG. 15(b), the correction coefficient K8 (0.5 to 1.0) increased as the integrating engine operating time X7 is lengthened is stored to table T8. In this mode, the correction coefficients K7, K8 stored to tables T7, T8 are set to the same value, but may be also set to different values.

Next, it proceeds to step S78, and the basic correction value α0 is multiplied by the correction coefficient K8 and the correction value α is calculated (α←α0·K8).

In step S79, the first threshold value SL1 stored to the nonvolatile memory is updated by a value provided by subtracting the correction value α from this first threshold value SL1 (SL1←SL1-α). As mentioned above, the correction coefficient K8 is increased as the integrating engine operating time X7 is lengthened. Therefore, the first threshold value SL1 is set to a high value as the integrating engine operating time X7 is lengthened. Thereafter, it proceeds to step S80, and the second judging flag F2 is cleared (F2←0) and it proceeds to step S81.

When it proceeds to step S81 from step S76 or step S80, the same processing as the above step S16 of FIG. 3 is executed and the upper-lower limit processing is performed and it is escaped from the routine.

Thus, in this mode, the value of the first threshold value SL1 can be changed in accordance with the integrating engine operating time X7 from the regeneration processing of the previous time to the regeneration processing of this time. Accordingly, an error after a judgment due to a change of an operating situation at a running time can be corrected, and higher judgment accuracy can be obtained.

Figure 16:
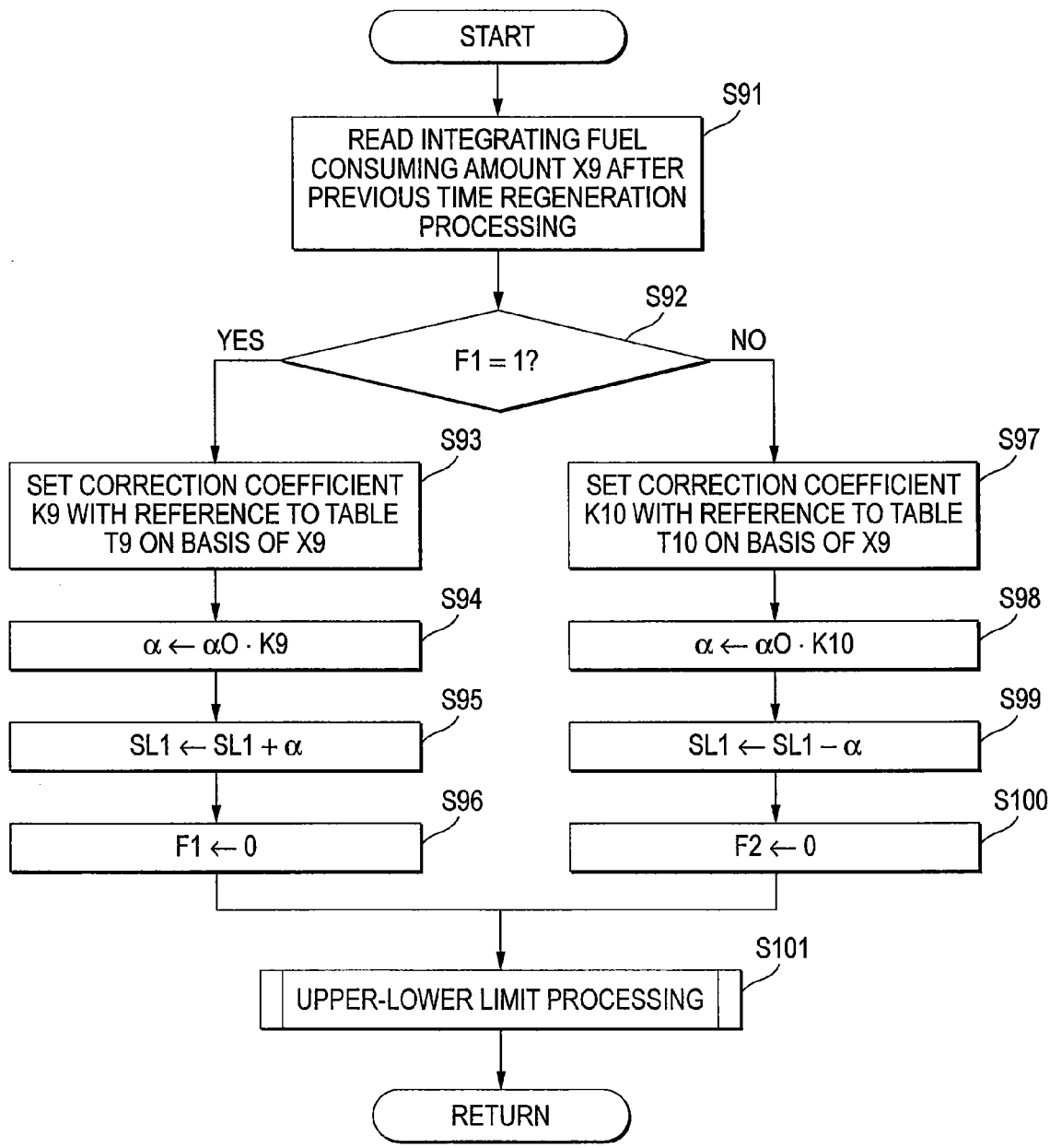
FIG. 16 is a flow chart showing a first threshold value setting subroutine in a fifth mode.

A fifth mode of the present invention is shown in FIGS. 16 and 17. This made is a modified example of the above third mode and the fourth mode. In the third mode, the first threshold value SL1 is changed in accordance with the running distance X5. In the fourth mode, the first threshold value SL1 is changed in accordance with the integrating engine operating time X7. However, in this mode, the first threshold value SL1 is variably set in accordance with an integrating fuel consuming amount X9.

Namely, in a first threshold value setting subroutine shown in FIG. 16, the integrating fuel consuming amount X9 after the DPF regeneration processing of the previous time is first read in step S91. For example, this integrating fuel consuming amount X9 is calculated by integrating a fuel consuming amount calculated on the basis of an intake air amount measured by the intake air amount sensor 11 after the regeneration processing of the previous time, and oxygen concentration within exhaust gas detected by an unillustrated air fuel ratio sensor.

Next, the value of the first judging flag F1 is referred in step S92. When F1=1, it is regeneration processing based on a judging result in the first judgment is processing. Therefore, it proceeds to step S93. When F1=0 (i.e., F2=1), it is regeneration processing based on the second judgment processing. Therefore, it proceeds to step S97.

In the following description, correction processing of the first threshold value SL1 after regeneration processing using the first judgment processing shown in steps S93 to S96 will first be explained. Subsequently, correction processing of the first threshold value SL1 after regeneration processing using the second judgment processing shown in steps S97 to S100 will be explained.

When it is judged as regeneration processing based on a judging result in the first judgment processing (F1=1) and it proceeds to step S93, a correction coefficient K9 is set with reference to table T9 with an interpolating calculation on the basis of the integrating fuel consuming amount X9. As shown in FIG. 17(a), the correction coefficient K9 (0.5 to 1.0) increased as the integrating fuel consuming amount X9 is increased is stored to table T9.

Next, it proceeds to step S94 and the basic correction value α0 is multiplied by the correction coefficient K9 and the correction value α is calculated (α←α0·K9). The correction value α is a fixed value, and is set to a value close to the upper limit value LMU, or the same value as the upper limit value LMU similarly to the first mode.

In step S95, the first threshold value SL1 stored to the nonvolatile memory is updated by a value provided by adding the correction value α to this first threshold value SL1 (SL1←SL1+α). As mentioned above, the correction coefficient K9 is set to a large value as the integrating fuel consuming amount X9 is increased. Therefore, the first threshold value SL1 is set to a high value as the integrating fuel consuming amount X9 is increased. Thereafter, it proceeds to step S96, and the first judging flag F1 is cleared (F1←0) and it proceeds to step S101.

On the other hand, when it is judged as regeneration processing based on a judging result in the second judgment processing (F1=0) and it proceeds to step S97, a correction coefficient K10 is set with reference to table T10 with an interpolating calculation on the basis of the integrating fuel consuming amount X9 after the regeneration processing using the second judgment processing. As shown in FIG. 17(b), the correction coefficient K10 (0.5 to 1.0) set to a large value as the integrating fuel consuming amount X9 is increased is stored to table T10. In this mode, the correction coefficients K9, K10 stored to tables T9, T10 are set to the same value, but may be also set to different values.

Next, it proceeds to step S98, and the basic correction value α0 is multiplied by the correction coefficient K10, and the correction value α is calculated (α←α0·K10).

In step S99, the first threshold value SL1 stored to the nonvolatile memory is updated by a value provided by subtracting the correction value α from this first threshold value SL1 (SL1←SL1-α). As mentioned above, the correction coefficient K10 is set to a large value as the integrating fuel consuming amount X9 is increased. Therefore, the first threshold value SL1 is set to a high value as the integrating fuel consuming amount X9 is increased. Thereafter, it proceeds to step S100, and the first judging flag F1 is cleared (F1←0) and it proceeds to step S101.

When it proceeds to step S101 from step S96 or step S100, the same processing as the above step S16 of FIG. 3 is executed and the upper-lower limit processing is performed and it is escaped from the routine.

Thus, in this mode, the value of the first threshold value SL1 can be changed in accordance with the integrating fuel consuming amount X9 from the regeneration processing of the previous time to the regeneration processing of this time. Accordingly, an error after a judgment due to a change of an operating situation at a running time can be corrected, and higher judgment accuracy can be obtained.

The present invention is not limited to each of the above modes. For example, when an abnormality is generated in a device, no DPF regenerating period can be precisely judged. Therefore, a fail safe function for protecting DPF 13 may be provided such that the regeneration processing of DPF 13 is early performed. For example, when the intake air amount sensor 11 is broken, no accurate intake air amount can be measured. An error is caused in the calculation of the instant PM generating amount. Therefore, the first threshold value SL1 is stuck to the lower limit value LML, etc., and is fixed at a low value. Otherwise, even when the intake air amount sensor 11 is broken, the second judgment processing normally functions if the differential pressure sensor 16 is normal. Therefore, the upper limit value LMU may be set at a low value, or the lower limit value LML may be set at a low value, and the first threshold value SL1 may be also updated as usual.

Further, when the differential pressure sensor 16 is broken, no clogging of DPF 13 can be accurately judged. Therefore, the regeneration processing based on a judging result using the second judgment processing becomes difficult. Therefore, when the differential pressure sensor 16 is broken, the first threshold value SL1 is stuck to the lower limit value LML, etc., and is fixed at a low value.

What is claimed is:

1. An exhaust cleaning device of a diesel engine in which a filter for catching and collecting a particulate matter within exhaust gas is arranged in an exhaust passage, and regeneration processing of the filter is performed in regeneration timing set in advance, the exhaust cleaning device comprising:
an operating state detecting member for detecting an operating state of the diesel engine;
an integrating member for presuming a generating amount of the particulate matter within the exhaust gas on the basis of the operating state detected by the operating state detecting member, and integrating the generating amount of the particulate matter on the basis of the is presumed generating amount of the particulate matter;
a first judging member for comparing the integrating amount integrated by the integrating member and a first threshold value set in advance, and judging a regenerating period of the filter;
a filter state detecting member for detecting a state of the filter;
a second judging member for comparing a detecting value showing the state of the filter detected by the filter state detecting member and a second threshold value, and judging the regenerating period of the filter;
a first correcting member for correcting the first threshold value on a reducing side when it is not judged as the filter regenerating period by the first judging member and it is judged as the filter regenerating period by the second judging member;
a second correcting member for correcting the first threshold value on an increasing side when it is not judged as the filter regenerating period by the second judging member and it is judged as the filter regenerating period by the first judging member; and
a regeneration processing member for performing regeneration processing of the filter when it is judged as the filter regenerating period in at least one of the first judging member and the second judging member.

2. The exhaust cleaning device of the diesel engine according to claim 1, wherein
the filter state detecting member detects a differential pressure before and after the filter as a detecting value.

3. The exhaust cleaning device of the diesel engine according to claim 1, wherein
an upper limit value is set with respect to the first threshold value read by the first judging member.

4. The exhaust cleaning device of the diesel engine according to claim 1, wherein
a lower limit value is set with respect to the first threshold value read by the first judging member.

5. The exhaust cleaning device of the diesel engine according to claim 3, wherein
the first threshold value is corrected on the basis of a correction amount set on the basis of the present first threshold value and the upper limit value or the lower limit value.

6. The exhaust cleaning device of the diesel engine according to claim 1, wherein
the first threshold value is corrected on the basis of the integrating amount of the particulate matter when it is judged as the regenerating period of the filter by the second judging member and the regeneration processing is started.

7. The exhaust cleaning device of the diesel engine according to claim 1, wherein
the first threshold value is corrected on the basis of a correction amount set on the basis of one of a continuous time number of the regeneration processing of the filter performed by the regeneration processing member by making a judgment as the regenerating period of the filter by the first judging member, and a continuous time number of the regeneration processing of the filter performed by the regeneration processing member by making a judgment as the regenerating period of the filter by the second judging member.

8. The exhaust cleaning device of the diesel engine according to claim 1, wherein
the first threshold value is corrected on the basis of a correction amount set on the basis of a running distance from a regeneration processing terminating time of the previous time to a regeneration processing starting time of this time.

9. The exhaust cleaning device of the diesel engine according to claim 1, wherein
the first threshold value is corrected on the basis of a correction amount set on the basis of an engine operation integrating time from a regeneration processing terminating time of the previous time to a regeneration processing starting time of this time.

10. The exhaust cleaning device of the diesel engine according to claim 1, wherein
the first threshold value is corrected on the basis of a correction amount set on the basis of an integrating fuel consuming amount from a regeneration processing terminating time of the previous time to a regeneration processing starting time of this time.

11. The exhaust cleaning device of the diesel engine according to claim 1, wherein
the first threshold value is fixed to a value set in advance when an abnormality is generated in the device.

12. The exhaust cleaning device of the diesel engine according to claim 1, wherein
when an abnormality is generated in the device, at least one of the upper limit value and the lower limit value is reduced until a value set in advance with respect to the upper limit value, and is reduced until a value set in advance with respect to the lower limit value.

13. The exhaust cleaning device of the diesel engine according to claim 4, wherein
the first threshold value is corrected on the basis of a correction amount set on the basis of the present first threshold value and the upper limit value or the lower limit value.

* * * * *